(12) United States Patent
Bel et al.

(10) Patent No.: US 12,101,001 B2
(45) Date of Patent: Sep. 24, 2024

(54) ENERGY CONVERSION DEVICE (71) Applicant: THALES, Courbevoie (FR)

(72) Inventors: François Bel, Chatou (FR); Maxime Migneau, Chatou (FR)

(73) Assignee: THALES, Courbevoie (FR)

( * ) Notice: Subject to any disclaimer, the term of this patent is extended or adjusted under 35 U.S.C. 154(b) by 276 days.

(21) Appl. No.: 17/787,564

(22) PCT Filed: Dec. 17, 2020

(86) PCT No.: PCT/EP2020/086785
§ 371 (c)(1),
(2) Date: Jun. 20, 2022

(87) PCT Pub. No.: WO2021/123002
PCT Pub. Date: Jun. 24, 2021

(65) Prior Publication Data
US 2022/0407376 A1   Dec. 22, 2022

(30) Foreign Application Priority Data
Dec. 19, 2019 (FR) ........................ 1914888

(51) Int. Cl.
*H02K 1/32* (2006.01)
*H02K 9/19* (2006.01)
*H02K 9/20* (2006.01)

(52) U.S. Cl.
CPC ............. *H02K 1/32* (2013.01); *H02K 9/19* (2013.01); *H02K 9/20* (2013.01)

(58) Field of Classification Search
CPC .................. H02K 1/32; H02K 9/20
USPC ................................................ 310/52
See application file for complete search history.

(56) References Cited

U.S. PATENT DOCUMENTS

| 5,019,733 A * | 5/1991 | Kano | H02K 9/19 |
| | | | 310/58 |
| 10,038,355 B2 * | 7/2018 | Brauer | H02K 9/19 |
| 10,680,478 B2 * | 6/2020 | Huber | B60K 11/02 |
| 2015/0048699 A1 * | 2/2015 | Ribarov | H02K 9/19 |
| | | | 310/54 |
| 2016/0164378 A1 * | 6/2016 | Gauthier | H02K 9/19 |
| | | | 310/54 |

(Continued)

FOREIGN PATENT DOCUMENTS

| CN | 204 205 841 U | 3/2015 |
| CN | 108 736 603 A | 11/2018 |
| DE | 10 2014 117 382 A1 | 6/2016 |

(Continued)

*Primary Examiner* — Alexander Talpalatski
(74) *Attorney, Agent, or Firm* — BakerHostetler (57) ABSTRACT

An energy conversion device includes a set of nozzles passing through the body of a shaft and configured to form an oil mist in the cavity under the effect of the rotation of the shaft in a range of rotational speeds, from a proportion of oil injected into the shaft, to cool a rotor module and a stator module, a duct secured to the shaft and comprising an inlet communicating with the internal volume so as to receive, under the effect of the rotation of the shaft, oil injected into the internal volume, the duct leading the other proportion of the oil as far as an outlet of the duct, a removal device for removing the oil leaving the duct to an oil reservoir without contributing to the oil mist.

11 Claims, 5 Drawing Sheets

(56) References Cited

U.S. PATENT DOCUMENTS

2016/0344247 A1   11/2016   Jeong et al.

FOREIGN PATENT DOCUMENTS

| DE | 10 2015 223 073 A1 | 5/2017 |
|----|--------------------|--------|
| JP | 2003-102147 A | 4/2003 |
| JP | 2009-118714 A | 5/2009 |
| JP | 2013-13182 A | 1/2013 |

* cited by examiner

FIG.6

ENERGY CONVERSION DEVICE

CROSS-REFERENCE TO RELATED APPLICATIONS

This application is a National Stage of International patent application PCT/EP2020/086785, filed on Dec. 17, 2020, which claims priority to foreign French patent application No. FR 1914888, filed on Dec. 19, 2019, the disclosures of which are incorporated by reference in their entirety.

FIELD OF THE INVENTION

The present invention relates to energy conversion devices, notably to generator devices able to convert a mechanical energy supplied by an engine into an electrical energy. The invention relates more specifically to the cooling of such electric machines.

The field of application of the invention is that of the generation of electrical energy from a mechanical energy supplied by an aircraft engine turbine. This energy is, for example, used to power an aircraft onboard network. However, the invention is also applicable to other types of engine such as, for example, industrial turbines, or turbines of auxiliary power units (APUs).

BACKGROUND

Historically, onboard electrical networks have operated at a fixed frequency of 400 Hz but because not all aircraft engines operate at a fixed speed, this type of generator was driven by the engines through a mechanical speed regulator. This speed regulator allowed a fixed speed to be produced at output from a variable-speed shaft input. With the advent of variable-frequency electrical networks, aircraft generators are now operating by generating over a broad range of speeds, typically in a ratio 1:2.

The invention applies quite specifically to the generator devices intended to operate on a variable range of speeds in order to allow electrical energy of variable frequency to be delivered when the generator device is generating electrical energy.

The generator device is, for example, a main electric machine of a brushless synchronous starter-generator. The main machine comprises a rotor module comprising an inductor and a stator module comprising an armature winding.

Figure 1:
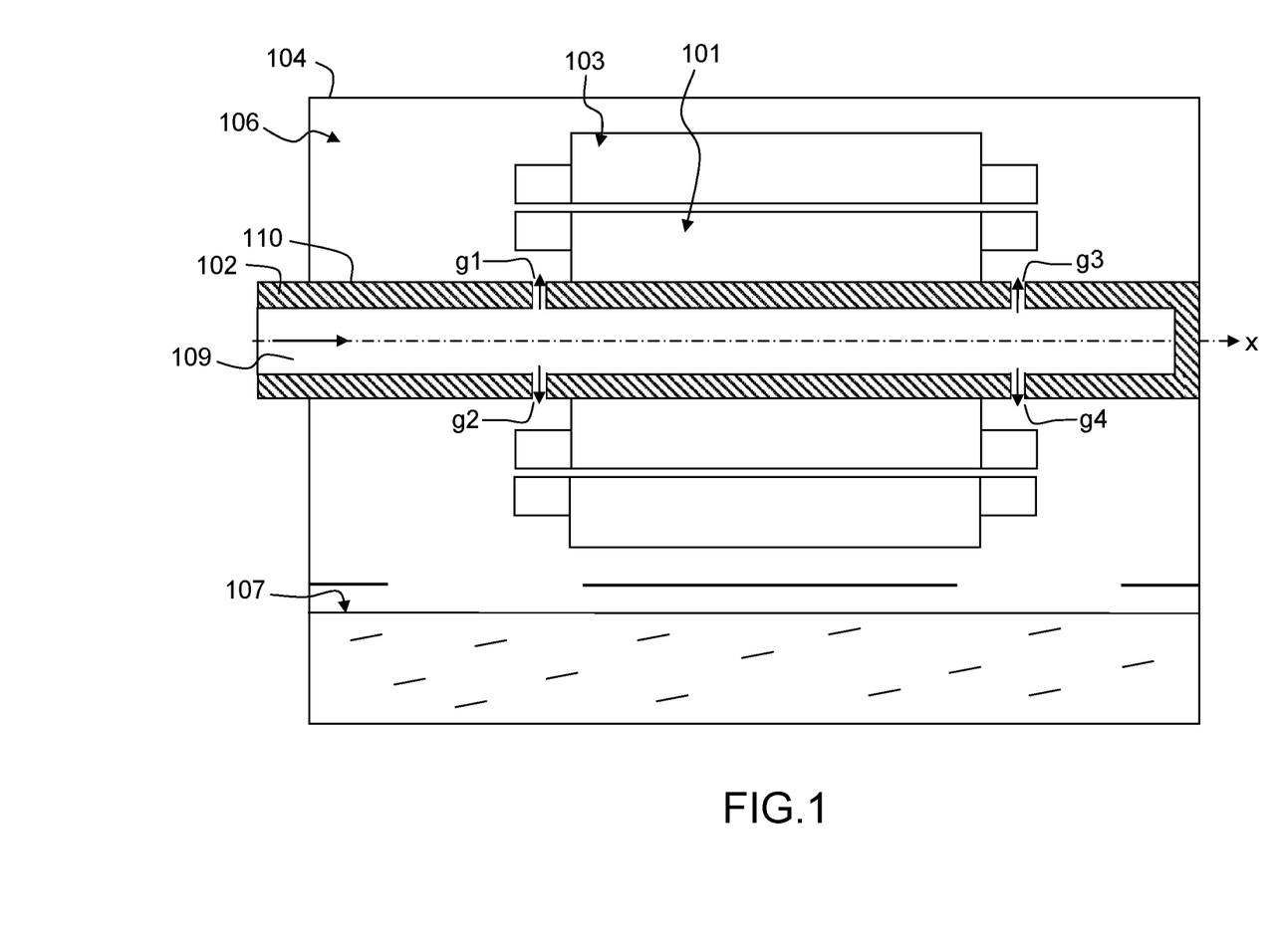
FIG. 1, already described, is a schematic depiction in section on a radial plane of a rotary machine of the prior art, FIG. 2, already described, is a schematic depiction of an oil circulation circuit of an energy conversion device of the prior art.

A main electric machine of this type is conventionally oil-cooled as depicted schematically in FIG. 1. The generator device comprises an oil circulation circuit able to generate an oil mist in a chamber 106 radially surrounding a hollow shaft 102, the rotor module 101 and the stator 103 so as to cool the rotor module 101 and the stator module 103. The rotor module 101 is secured to the hollow shaft 102 and mounted with the ability to rotate with respect to the stator 103 and to a casing 104. The casing 104 is also delimited by a reservoir 107 to which the oil is returned, under gravity, after having formed the oil mist. The oil circulating circuit comprises a pump, not visible in FIG. 1, able to draw up oil from the reservoir 107 and inject it, in the direction of the arrow, into an internal volume 109 of the hollow shaft 102 delimited by a hollow-shaft body 110. The hollow shaft 102 comprises nozzles g1, g2, g3, g4 formed in the body 110 of the hollow shaft and providing fluidic communication between the internal volume 109 of the hollow shaft 102 and the chamber 106 and configured to form an oil mist in the chamber 106 using oil injected into the internal volume 109 of the hollow shaft 102, while the shaft 102 is rotating. The pump is conventionally a rotary positive-displacement pump mechanically coupled to the hollow shaft 102 for rotation about the longitudinal axis of the hollow shaft 108.

When the generator device is operating at a variable speed, the flow rate of oil delivered by this type of pump is proportional to its rotational speed. As a result, the flow rate of oil injected by the pump into the internal volume 109 of the hollow shaft 102 increases when the rotational speed of the hollow shaft 102 increases, which has the effect of increasing the flow rate of oil injected into the chamber and therefore the density of the oil mist present in the chamber 106.

However, at low speed, when there is a desire to deliver a low-frequency current, the oil flow rate needs to be high enough to provide correct cooling of the rotor module and of the stator module of the main electric machine. At high speed, when there is a desire to deliver a high-frequency current, the flow rate then generally greatly exceeds the requirement.

Moreover, the mechanical losses associated with the rotation of the rotary parts of the main electric machine in the oil mist intrinsically increase with the rotational speed. When, in addition, the flow rate of oil atomized in the chamber increases with the speed, the density of the oil mist increases also with the speed and the effect of the increase in speed on the mechanical losses is further aggravated. The mechanical losses therefore significantly reduce the efficiency of the electric machine. The increase in the density of the mist may also lead to phenomena whereby the main electric machine bubbles in the oil and this may prevent it from operating, particularly when the main electric machine is inclined, which is to say when its shaft is inclined with respect to a horizontal plane (when the trim attitude of the aircraft is non zero).

A first solution for limiting these phenomena is to reduce the diameter of the active parts (rotor module and stator module) of the electric machine. The disadvantage with this solution is that it increases the cantilever moment of the electric machine and the mass thereof. Specifically, the machine is designed to have minimal mass. The electromagnetic design is focused on obtaining this minimal mass and determines, amongst other things, the optimal dimensions of the machine, namely the diameter and length thereof. Reducing the diameter of the active parts is a departure from this optimal solution and leads to an increase in the mass of the electric machine.

A second solution is to limit the oil flow rate to the minimum, with the disadvantage of less cooling at low speed.

These two solutions are unable to provide a flow rate regulated as a function of speed but do allow the generator device to accommodate an increase in the rotational speed of the hollow shaft at the expense of an impact on performance (greater mass and/or greater heating).

Figure 2:
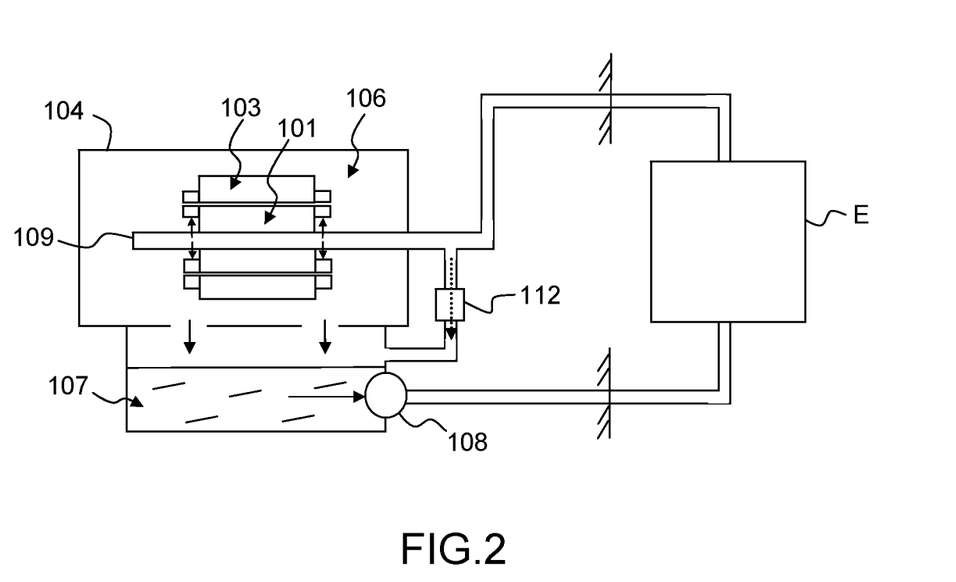

A third solution depicted in FIG. 2 is to introduce into the oil circulation circuit a regulating valve 112 for limiting the increase in the flow rate of oil atomized into the chamber with the increase in speed. This regulating valve 112 takes part of the oil delivered by the pump 108 after cooling by a heat exchanger E and before it is injected into the chamber 106 and sends it directly to the reservoir 107. More specifically, the oil taken by the regulating valve 112 at the outlet of the pump 108 is injected into the reservoir 107 without passing through the nozzles g1 to g4, thereby making it possible to limit the flow rate of oil injected into the chamber 106, namely the density of the oil mist in the cavity 106. The valve 112 is regulated in such a way as to limit the increase in the flow rate of oil injected into the chamber 106 via the nozzles g1 to g4 as a result of an increase in the rotational speed of the hollow shaft 102 or in such a way as to keep this flow rate constant.

This third solution does, however, suffer from a certain number of disadvantages. It is based on the introduction of an additional component; the valve, which leads to a higher cost of manufacture and reduces the reliability of the generator device. Specifically, the valve 112 may be sensitive to contamination of the oil with particles that could block it and thus reduce the flow rate at low speed. In addition, the valve is generally based on a piston-spring system liable (depending on its time constant) to give rise to resonance in the oil circuit as a function of variations in flow rate and in pressure, for example, when the pump outlet pressure pulsates. Furthermore, the maximum stroke of the valve piston limits the oil flow rate regulating capacity thereof. Once the valve is wide open, the oil flow rate is no longer regulated. Furthermore, because the valve operates as a function of inlet pressure, the inlet pressure will nevertheless increase with the speed and so even if the valve reduces the increase in the flow rate of oil entering the cavity 106 via the nozzles g1 to g4, this flow rate still has to increase with speed. This solution necessitates the provision of a high-performance heat exchanger to remove high speed energy losses. On the other hand, a larger amount of power has to be tapped from the turbine, thereby reducing the efficiency of the electric machine.

A fourth solution is to have the pump driven by a means other than the shaft of the electric machine, for example by a dedicated pump motor, thereby making it possible to regulate the flow rate of oil delivered by the pump independently of the rotational speed of the shaft of the electric machine. This solution has manifest disadvantages of adding to the complexity of the architecture of the oil circulation circuit: the addition of a motor, of motor regulation, of additional wiring for controlling it, and this all has a significant impact on the mass, cost and the reliability of the generator device.

SUMMARY OF THE INVENTION

It is an object of the invention to limit at least one of the abovementioned disadvantages.

To this end the subject of the invention is an energy conversion device able to produce electricity from a mechanical energy and/or vice versa, the energy conversion device comprising:
  a casing,
  a shaft comprising a body defining an internal volume, the shaft being intended to rotate in a predetermined direction about a longitudinal axis with respect to the casing in a predetermined range of rotational speeds,
  a rotor module secured to the shaft,
  a stator module secured to the casing, the rotor module and the stator module comprising a field winding and an armature winding that are magnetically coupled to one another, the casing delimiting an internal volume housing the rotor module and the stator module and comprising a cavity surrounding the rotor module and the stator module,
  a set of at least one nozzle passing through the body and providing fluidic communication between the internal volume and the cavity, the set of at least one nozzle being configured to form an oil mist in the cavity under the effect of the rotation of the shaft in the range of rotational speeds, from some of the oil injected into the internal volume of the hollow shaft, the oil mist being intended to come into direct physical contact with the rotor module and the stator module,
  a set of at least one regulating circuit configured to limit an increase in the flow rate of oil passing from the internal volume to the cavity through the set of at least one nozzle, said increase being due to an increase in the flow rate of oil injected into the internal volume, the regulating circuit comprising:
    a duct secured to the shaft and comprising an inlet communicating with the internal volume so as to receive, under the effect of the rotation of the shaft, another portion of the oil injected into the internal volume, the duct conveying the other portion of the oil to an outlet of the duct,
    a removal device configured to remove at least a portion of the oil leaving the duct into an oil reservoir without contributing to the oil mist.

Advantageously, the duct, under the effect of centrifugal force, receives the other portion of the oil injected into the internal volume, the duct conveying the other portion of the oil as far as an outlet of the duct.

Advantageously, the device comprises an oil circulation pump configured to take oil from the oil reservoir and inject it into the internal volume of the shaft, the pump being mechanically coupled to the shaft so as to be rotationally driven by the shaft so that a flow rate of oil injected by the pump into the internal volume increases when there is an increase in the rotational speed of the shaft in the direction of rotation.

Advantageously, the duct comprises a main duct radially surrounded by the stator module and configured to convey the oil that it receives, when the shaft rotates, translationally with respect to the shaft along the longitudinal axis and/or rotationally with respect to the body of the shaft about the longitudinal axis, around the internal volume.

Advantageously, the main duct of the duct of a regulating circuit is formed in the body of the shaft and is closed by the rotor module.

Advantageously, the main duct of the duct of a regulating circuit is spiral wound around the longitudinal axis and configured to draw oil into the inlet of the main duct as the shaft rotates.

Advantageously, the geometric characteristics of the duct are defined so that the duct transports all or some of a surplus of the flow rate of oil injected by the pump into the internal volume, above and beyond a minimum flow rate, over the entire range of rotational speeds.

Advantageously, the removal device comprises a collecting cap placed in the cavity and fixed relative to the casing, the collecting cap radially surrounding an outlet of the duct so as to collect at least some of the oil leaving the duct under the effect of centrifugal force as the shaft rotates in the direction of rotation.

Advantageously, the removal device comprises a removal opening situated facing the oil reservoir and allowing oil collected by the cap under gravity to be removed to the oil reservoir.

Advantageously, the collecting cap comprises a ring completely radially surrounding the outlet and configured so as to allow oil leaving the duct, to be held back radially, and axially in both directions, an opening being formed in the ring facing the oil reservoir.

Advantageously, the collecting ring is equipped with a removal tube having an inlet surrounding the opening and extending as far as the removal opening.

Advantageously, the duct is configured to limit an increase in the flow rate of oil passing from the internal volume to the cavity via the set of at least one nozzle, said increase being due to an increase in the flow rate of oil injected into the internal volume.

BRIEF DESCRIPTION OF THE DRAWINGS

Further features, details and advantages of the invention will become apparent from reading the description given with reference to the attached drawings provided by way of example and which, respectively, depict.

From one figure to another, the same elements are identified by the same references.

DETAILED DESCRIPTION

The invention relates to an energy conversion device comprising a rotary electric machine capable of converting electrical energy into mechanical energy and/or vice versa. The invention relates to the field of the cooling of such a rotary electric machine.

One field of application of the invention is that of the generation of electrical energy from mechanical energy supplied by a gas turbine for an aircraft engine. However, the invention is applicable to other types of engine such as, for example, industrial turbines or the turbines of auxiliary power units or APUs.

The energy conversion device is, for example, a brushless wound rotor synchronous starter generator, which is to say one comprising a main electric machine, an exciter and a rotary rectifier. The energy conversion device therefore comprises a main electric machine, an exciter, and a rotary rectifier bridge connecting the main electric machine and the exciter. The main machine comprises a rotor module comprising a field winding and a stator module comprising an armature winding. The rotor module of the exciter forms an armature winding and the stator module of the exciter forms a field winding. The energy conversion device is configured so that a multiphase alternating current is induced in the rotor module of the exciter in generator mode as the rotor module of the exciter rotates when a DC current is injected into the field winding of the exciter. The multiphase AC current induced in a rotor of the exciter in generation mode is rectified by a rotary rectifier bridge and then injected into the field winding of the main machine so that another multiphase AC current is induced in the armature winding of the main machine. The frequency of the multiphase AC current induced in the armature winding of the main machine varies according to the rotational speed of the shaft.

The invention may relate to the cooling of the main electric machine and/or of the exciter.

The energy conversion device may, as a variant, relate only to the main electric machine or to the exciter or to any other rotary electric machine.

Figure 3:
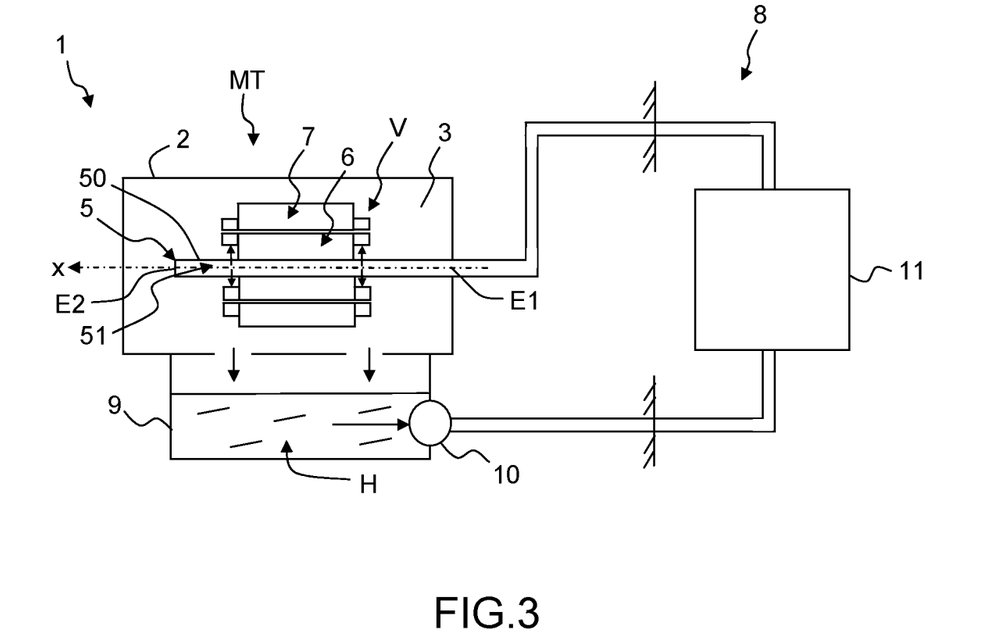
FIG. 3 is a schematic depiction of an oil circulation circuit of an energy conversion device according to the invention.

In general, the energy conversion device 1 comprises, as visible in FIG. 3, a rotary electric machine MT comprising a rotor module 6 and a stator module 7 comprising a field winding and an armature winding which are magnetically coupled to one another and mounted with the ability to rotate relative to one another. The field winding is contained within the rotor module and the armature winding is contained within the stator module, or vice versa.

The rotary machine MT comprises a shaft 5 extending longitudinally along a longitudinal axis x and intended to rotate in a predetermined direction about the longitudinal axis. The shaft 5 is a hollow shaft. It comprises a body 50 delimiting an internal volume 51 extending longitudinally along the axis x.

The rotor module 6 is secured to the shaft 5. The rotor module 6 and the shaft 5 are intended to rotate, about the axis x, with respect to the stator module 7. Drive means are advantageously provided to drive the rotation of the shaft 5 about its axis x.

The rotor module 6 radially surrounds the shaft 5. The stator module 7 radially surrounds the rotor module 6. In the following text, the terms radial and axial are defined with respect to the axis x.

As a preference, the rotor module 6 completely surrounds the axis x. In other words, the rotor module 6 completely surrounds the shaft 5 in the radial sense, which is to say in a plane perpendicular to the axis x. Likewise, the stator module 7 advantageously completely surrounds the axis x radially. In other words, the stator module 7 completely surrounds the rotor module 6, radially, which is to say in the plane perpendicular to the axis x.

The rotary machine MT comprises a casing 2 that is fixed with respect to the stator module 7.

The casing 2 delimits a casing internal volume V. The stator module 7 and the rotor module 6 are positioned inside the casing internal volume V and are surrounded by a cavity 3 which is part of the casing internal volume V.

The cavity 3 completely radially surrounds the part of the shaft 5 that is situated in the casing internal volume V delimited by the casing 2. This part of the shaft extends axially from an axial position E1 of the shaft 5 as far as an axial position E2 of the shaft 5.

The internal volume 51 is closed axially at the second position E2.

The cavity 3 surrounds the rotor module 6 and the stator module 7.

Advantageously, the cavity 3 completely surrounds the rotor module 6 and the stator module.

In other words, the cavity 3 completely radially and, axially in both directions, surrounds the rotor module 6 and the stator module 7. What is meant by the cavity 3 completely radially surrounding the rotor module 6 and the stator module 7 is that the cavity 3 radially separates the stator module 7 from the casing 2.

The cavity 3 radially separates from the casing 2 an external surface 71 radially delimiting the stator module 7 and which is situated facing the casing 2.

The cavity 3 is thus delimited by the casing 2, the rotor module 6, the stator module 7 and the shaft 5.

The device 1 comprises an oil circulation circuit 8 configured to cause the oil to circulate in closed loop. The oil circulation circuit 8 comprises a pump 10, a reservoir 9, the shaft internal volume 51 and nozzles which will be described later on. The circulation pump 10 is intended to take oil H from an oil reservoir 9 and inject it into the internal volume 51 of the shaft 5. The oil H is injected upstream of nozzles which will be described later on and by means of which the oil injected into the volume 51 exits the volume 51 via the nozzles, as the shaft 5 rotates about its longitudinal axis x, to form an oil mist in the cavity 3. The oil mist is intended to come into direct physical contact with the rotor module 6 and the stator module 7, thus cooling the rotor module 6 and the stator module 7.

Advantageously, the oil circulation circuit 8 comprises a heat exchanger 11 through which the pump 10 injects the oil into the internal volume 51 of the shaft 5 so as to cool the oil taken from the oil reservoir 9 before injecting it into the internal volume. Specifically, the temperature of the oil that makes up the oil mist increases upon contact with the stator module 6 and the rotor module 7 before dropping back into the reservoir 9 under the effect of gravity.

The pump 10 is mechanically coupled to the shaft 5 so as to be rotationally driven by the shaft 5 and is configured so that the flow rate of oil injected by the pump 10 into the internal volume 51 increases with the rotational speed of the hollow shaft 5 in the direction of rotation.

The pump 10 is conventionally a rotary positive displacement pump mechanically coupled to the hollow shaft 5 in terms of rotation about the longitudinal axis of the hollow shaft. When the generator device is operating at variable speed, the flow rate of oil delivered by this type of pump increases with the rotational speed.

When the generator device is operating at variable speed, the flow rate of oil delivered by this type of pump is, to a first approximation, proportional to its rotational speed.

Figure 4:
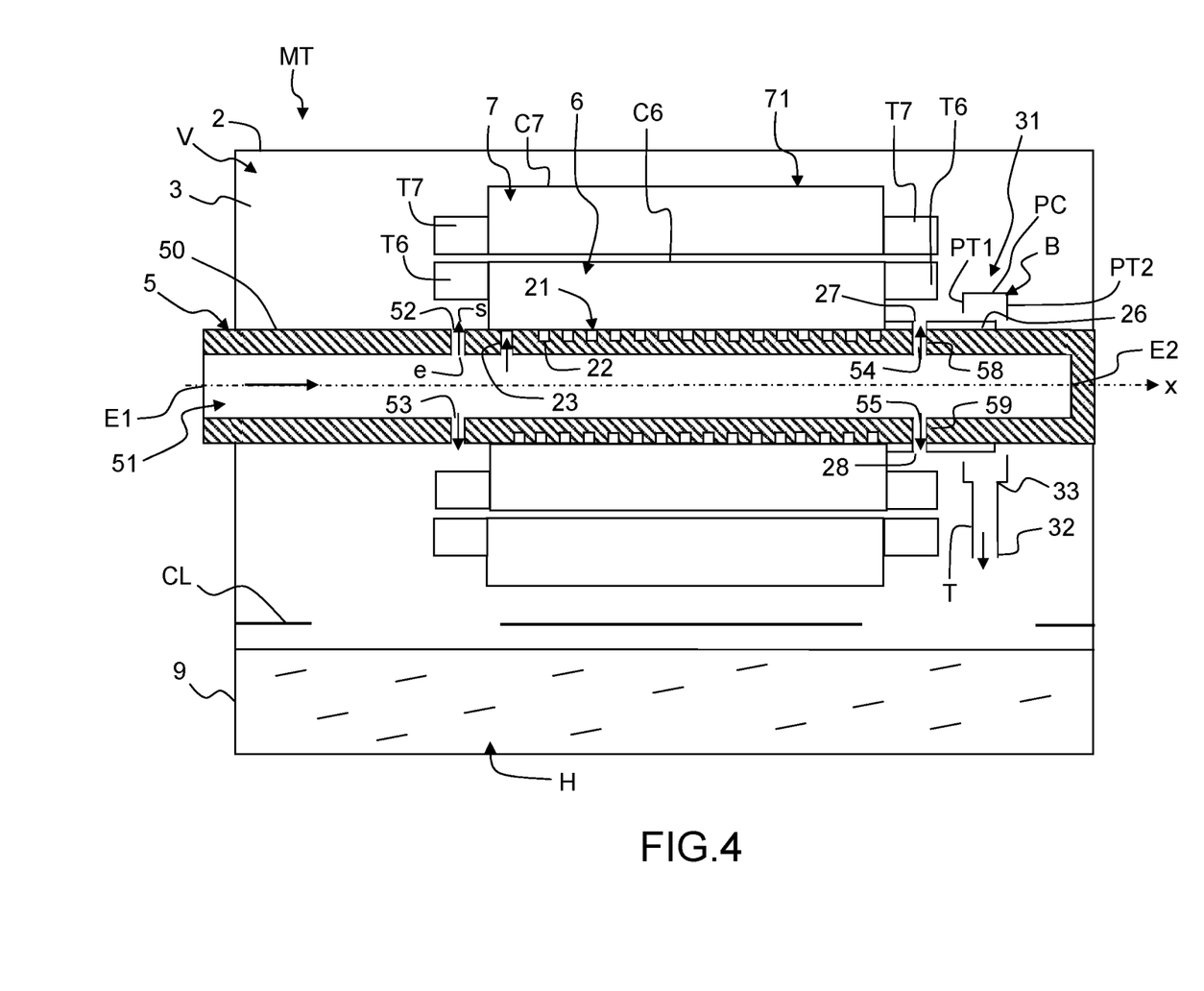
FIG. 4 is a schematic depiction, in section on a first radial plane, of one example of a rotary electric machine according to the invention.
Figure 5:
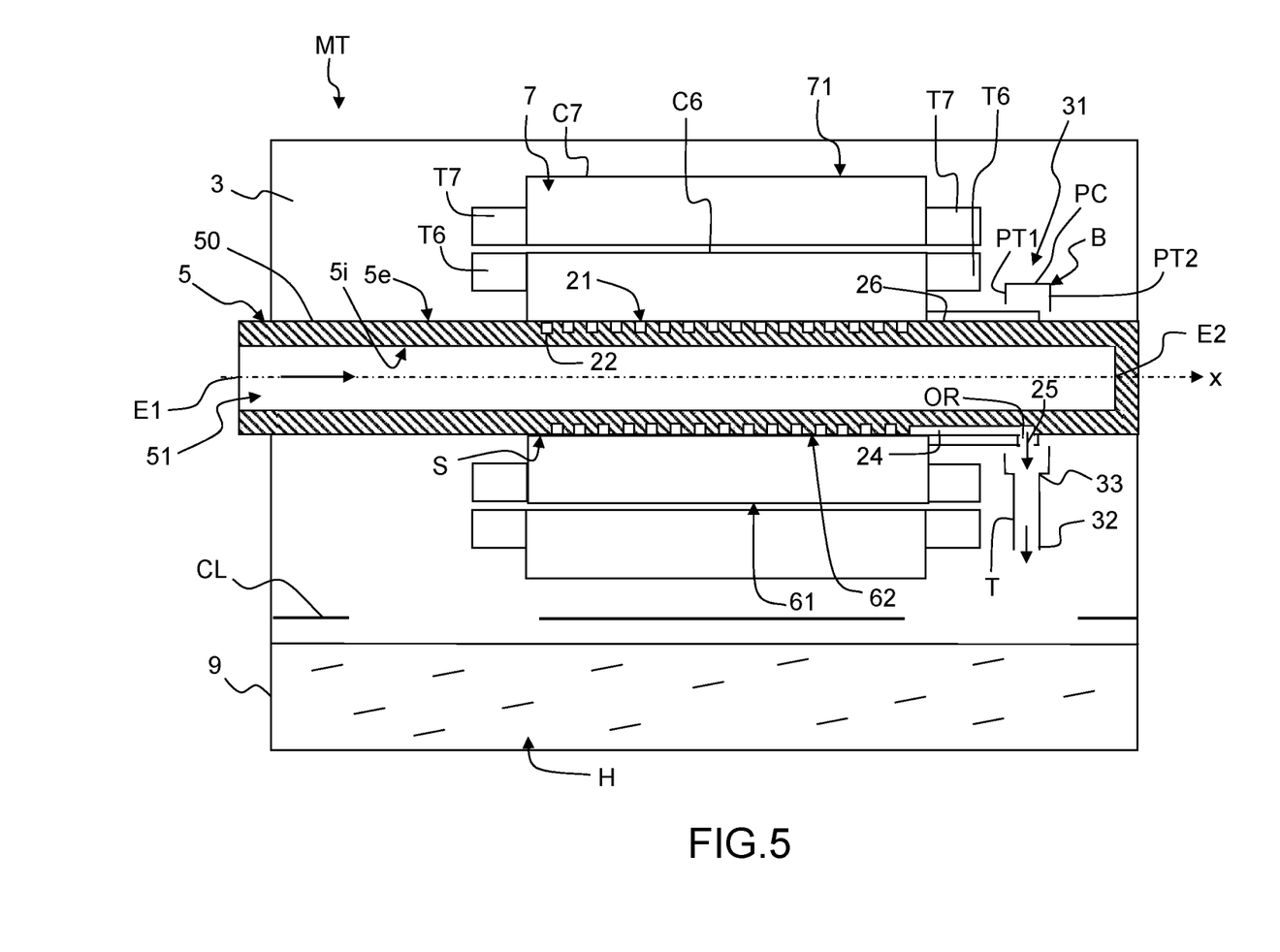
FIG. 5 is a schematic depiction, in section on a second radial plane, of the rotary machine of FIG. 4.

The part of the device 1 that is situated inside the casing 2 is depicted schematically in two radial sections, in FIGS. 4 and 5. The shaft 5 has rotated through 90° about the axis x between FIGS. 4 and 5.

An exciter and a rotary rectifier bridge may be positioned inside the internal volume delimited by the casing 2 but these have not been depicted in this figure.

Oil is injected axially into the internal volume 51 at a first position E1 along the axis x, in the direction indicated by the arrow visible in FIGS. 4 and 5, to generate a flow of oil along the longitudinal axis x. The direction of the arrow defines a direction extending from upstream to downstream.

As visible in FIG. 4, in order to allow the cooling of the rotor module 6 and of the stator module 7, the shaft 5 comprises a set of at least one nozzle 52, 53, 54, 55 (four nozzles 52 to 55 in the nonlimiting embodiment of FIG. 4) for cooling the rotor module 6 and the stator module 7 and which pass through the body 50 to provide fluidic communication between the internal volume 51 and the cavity 3.

The oil is injected by the pump 10 upstream of the set of at least one nozzle 52 to 55.

The set of at least one nozzle 52 to 55 is configured so as to form an oil mist in the cavity 3 using part of the oil injected axially into the internal volume 51. In other words, each nozzle for the cooling of the rotor module 6 and of the stator module 7 is configured and arranged to spray part of the oil injected into the internal volume 51, upstream of the nozzle 52, 53, 54 or 55, into the cavity 3 so as to form an oil mist in the cavity 3 which mist is intended to come into direct physical contact with the rotor module 6 and the stator module 7.

Each nozzle for the cooling of the rotor module 6 and of the stator module 7 comprises, for example, a duct formed in the body 50 and passing through the body 50 so as to place the internal volume 51 in fluidic communication with the cavity 3.

In the nonlimiting example of the figures, each cooling nozzle 52 to 55 for cooling the rotor module 6 and the stator module 7 extends longitudinally in a way that is radial with respect to the axis x.

As an alternative, at least one cooling nozzle 52 to 55 for the cooling of the rotor module 6 and of the stator module 7 has a different orientation and/or geometry provided that it opens both into the internal volume 51 and into the cavity 3. At least one cooling nozzle extends, for example, longitudinally in a plane that is inclined with respect to a plane perpendicular to the axis x.

In the text that follows, what is meant by a nozzle, is a cooling nozzle for cooling the rotor module 6 and the stator module 7 as defined hereinabove. It should be noted that the device according to the invention could comprise other nozzles suitable for cooling other parts of the device, such as the ball bearings for example.

Each nozzle comprises an inlet e via which the oil enters the nozzle and an outlet s via which the oil leaves the nozzle and enters the cavity 3. For greater clarity, only the inlet e and the outlet s of the nozzle 52 are referenced in FIG. 4, and in FIG. 4 only.

The stator module 7 and the rotor module 6 each comprises a body C7 and C6 respectively, which are cylindrical overall and comprise a stack of a plurality of radially stacked laminations. The rotor module 6 comprises a winding comprising at least one coil. The winding comprises winding overhangs T6 protruding axially beyond the body C6 of the rotor module 6. The stator module 7 comprises a winding comprising at least one coil. The winding comprises winding overhangs T7 protruding axially beyond the body C7 of the stator module 7.

The body C7 advantageously extends substantially over the entire length of the body C6 along the axis x.

In the particular but nonlimiting embodiment of the figures, the outlets of the cooling nozzles for cooling the rotor module 6 and the stator module 7 are positioned facing at least one winding overhang T6, T7 of the rotor module 6 and/or of the stator module 7. In that way, the stator module and rotor module cooling nozzles 52 to 55 spray the oil directly onto at least one winding overhang T6 of the rotor module 6 and/or at least one winding overhang T7 of the stator module 7. That ensures effective cooling of the module concerned by the spraying of the oil at the winding overhangs.

As an alternative, the outlet of at least one nozzle is positioned facing the casing 2.

The oil mist formed by the nozzles 52 to 55 is able to cool the rotor module 6 and stator module 7 before dropping back, under gravity, into an oil reservoir 9 delimited by the casing 2, which is to say forming part of the casing internal volume V. The oil reservoir 9 is in fluidic communication with the cavity 3 via partitions CL that might be present.

The device 1 is configured so that the oil reservoir 9 is situated beneath the rotor module 6 and the stator module 7, along a vertical axis z, during normal use of the device 1. The vertical is a straight line aligned with the gravity vector of the device 1.

According to the invention, the device 1 comprises, as visible in FIGS. 4 and 5, a set of at least one oil mist density regulating circuit configured to limit an increase in the flow rate of oil passing from the internal volume 51 to the cavity 3 through the set of at least one nozzle 52, 53, 54, 55 beyond a predetermined non-zero minimum oil flow rate Dmin, under the effect of an increase in the flow rate of oil injected by the pump 10 into the internal volume 51 as a result of an increase in the rotational speed of the shaft 5 within a predetermined range of rotational speeds of the shaft. This range of operating speeds extends continuously from a nonzero predetermined minimum speed Vmin to a maximum speed Vmax.

In other words, the regulating circuit is configured to limit the increase in the density of the oil mist with an increase in rotational speed of the shaft. This makes it possible to limit the mechanical losses associated with the rotation of the rotor in the oil mist.

The regulating circuit comprises a duct 21 secured to the shaft 5. The duct 21 comprises a main duct 22, an inlet duct 23, visible in FIG. 4, and an outlet duct 24, visible in FIG. 5. The main duct 22, the inlet duct 23 and the outlet duct 24 are portions of the duct 21.

The inlet duct 23 provides fluidic communication between the main duct 22 and the internal volume 51 so that the main duct 22, under the effect of the centrifugal force associated with the rotation of the shaft 5 about its axis x in the predetermined direction of rotation, receives some of the oil injected into the internal volume 51. This makes it possible to encourage the diverting of the oil by the main duct 22 when the speed increases without the need to provide an additional external device such as, for example, a pickup pump picking up oil at the outlet, or an upstream flow regulating device such as a regulating valve.

The duct 21 is configured to convey the oil that it receives, as the shaft 5 rotates in the direction of rotation, around the internal volume 51 as far as an outlet 25 of an outlet duct 24.

The duct 21 is configured so as to convey the oil that it receives, as the shaft 5 rotates in the direction of rotation, translationally with respect to the body 50 of the shaft 5 along the axis x and/or rotationally with respect to the body 50 of the shaft 5 about the axis x.

The regulating circuit comprises a removal device configured to remove the oil leaving the outlet duct 24, into the oil reservoir 9 without contributing to the oil mist.

The removal device comprises a collecting cap 31 that is fixed with respect to the casing 2. The collecting cap 31 is positioned in the cavity 3.

The collecting cap 31 at least radially surrounds an outlet 25 of the outlet duct 24 so as to collect at least some of the oil leaving the duct 21 under the effect of centrifugal force as the shaft 5 rotates in the direction of rotation.

Advantageously, the cap 31 is configured and positioned in such a way as to hold back radially and, preferably, although not necessarily axially in one direction or in both directions the flow of oil ejected at the outlet 25 of the outlet duct 24. The oil is deposited on the walls of the cap 31.

The cap is configured so that the oil held back by the cap 31 is collected, under the effect of gravity, in the oil reservoir 9. Thus, the oil collected by the cap 31 is discharged directly to the oil reservoir 9 under gravity, without forming oil mist in the cavity 3.

The removal device comprises, for example, a removal opening 32 positioned facing the oil reservoir 9 so as to remove the oil collected by the cap 31, under the effect of gravity, to the oil reservoir 9. Thus, the oil that is deposited on the walls of the cap 31 trickles towards the removal opening 32 and drops, through the opening 32, into the oil reservoir 9 under the effect of gravity.

Advantageously, the removal opening 32 is configured and arranged in such a way that the oil leaving via the opening 32 is not sprayed directly onto the rotor module 6.

More advantageously, the removal opening 32 is configured and arranged in such a way that the oil leaving via the opening 32 is not liable to come into contact with the rotor module 6. Thus, the opening 32 is configured and arranged in such a way that the oil leaving the opening 32 is not sprayed directly onto the rotor module 6 and is not liable to be sprayed indirectly onto the rotor module 6, for example by being sprayed onto a surface close to the rotor module 6.

Advantageously, the removal opening 32 is situated at a radial distance from the axis x that is greater than or equal to the highest radial distance radially separating the winding overhangs T6 of the rotor module 6 or the rotor module 6 from the axis; advantageously, the removal opening 32 is situated at a radial distance from the axis x that is greater than or equal to the highest radial distance radially separating the winding overhangs T7 or the rotor module 6 from the axis x.

The cap 31 completely surrounds the shaft 5 radially and is fixed with respect to the casing 2. It therefore prevents the ejection, toward the rotor module and the stator module, of at least some of the oil transported by the outlet duct 23 rotating about the axis x with the shaft 5 under the effect of centrifugal force. The oil thus slowed no longer has the kinetic energy required to form the oil mist and is delivered directly to the reservoir 9 under the effect of gravity, without forming oil mist.

Thus, the regulating circuit according to the invention allows at least some of the surplus oil supplied by the pump at high speed to be diverted and delivered directly to the reservoir 9 without forming oil mist. This makes it possible to limit the increase in mechanical losses at high speed.

The implementation of the solution is simple because it consists merely in adding an assembly of at least one duct to the rotor assembly (rotor module and shaft) and the collecting device. Furthermore, this solution is relatively reliable and inexpensive because it does not require the addition of components having moving parts, such as regulating valves. This solution, through the choice of the configuration of the duct, allows a progressive influence over the entire range of speeds and allows the oil flow rates to be regulated precisely over the entire range of operating speeds. This solution is less sensitive to contamination of the oil than a solution based on the opening/closing of an orifice. This solution does not lead to risks of resonance in the oil circuit.

In the particular embodiment of FIGS. 4 and 5, the outlet duct 24 is a groove, visible in FIG. 5, formed on the external surface S of the hollow shaft 5. The groove 24 is closed by a closure cap 26 that is fixed relative to the shaft 5 so that the oil injected by the main duct 22 into the groove 24 remains confined in the groove until it reaches the outlet 25 of the groove 24.

In the nonlimiting embodiment of FIG. 5, the groove 24 extends linearly along the axis x. In a variant, the groove 24 could be curved.

Ducts 27, 28 are formed in the closure cap 26 These ducts pass radially through the closure cap 26 and open to face first ducts 58, 59 formed in the body 50 of the shaft 5 and passing radially through the body 50, and facing the cavity 3.

The duct 27 and the first duct 58 form the nozzle 54, and the duct 28 and the first duct 59 form the nozzle 55, in the nonlimiting embodiment of FIG. 5.

In the nonlimiting embodiment of FIGS. 4 and 5, the closure cap 26 completely radially surrounds the hollow shaft 5. The closure cap 26 has a radial opening OR, visible in FIG. 5, situated facing a longitudinal end of the groove 24 so as to form the outlet 25 of the groove 24.

It should be noted that the groove 24 is situated in a radial plane distinct from the nozzles 54 and 55. These planes make an angle of 90° about the axis x in the examples of FIGS. 4 and 5.

More generally, the groove 24 is advantageously positioned in a radial plane distinct from any nozzle situated in the same plane perpendicular to the axis x as the groove. This makes it possible to avoid fluidic communication between the duct 11 and the nozzles 54 and 55.

The collecting cap 31 may be mounted on the casing 2 or on a housing containing a ball bearing for guiding the rotation of the shaft 5 about the axis x with respect to the casing 2.

In the nonlimiting embodiment of FIG. 5, the collecting cap 31 comprises a ring B completely radially surrounding the shaft 5 facing the outlet 25 of the groove 24 or, more generally, the outlet of the outlet duct. The ring B is fixed with respect to the casing 2.

There is a functional clearance between the collecting cap 31 and the shaft 5 so as to allow the shaft to rotate with respect to the collecting cap 31. The size of the clearance is advantageously as small as possible to allow this rotation while at the same time limiting as far as possible the ejection of oil through the functional clearance. In a variant, the minimum radial distance between the collecting cap 31 and the shaft 5 is greater than the functional clearance and chosen on the basis of a cost/performance trade-off.

The ring B is configured and positioned in such a way as to radially and axially in both directions hold back the oil leaving via the outlet 25. The oil is deposited on the walls PC, PT1, PT2 of the ring and trickles as far as an opening 33 made in the ring B, under the effect of gravity.

The ring B comprises, for example, a wall PC that is cylindrical overall and completely surrounds the shaft 5 radially facing the outlet 25 and two transverse walls PT1, PT2 substantially perpendicular to the axis x. The outlet 25 is fully comprised between the two transverse walls PT1 and PT2. The cylindrical wall PC is pierced with the opening 33.

Advantageously, the ring B is equipped with a removal tube T completely surrounding the opening 33 and elongate from the opening 33 as far as the removal opening 32 situated facing the oil reservoir 9. The removal tube T is able to contain the oil coming from the removal opening 32 in a tubular volume delimited by the removal tube before it is removed via the removal opening 32. The oil trickling along the ring trickles along the removal tube to be removed directly to the reservoir without contributing to creating the oil mist. The tube 31 is also able to guide, directly to the oil reservoir 9, some of the oil that is expelled through the outlet of the duct, directly opposite the opening 32 as the shaft rotates so that it does not contribute to the oil mist.

The tube T is connected to the ring B.

The tube T is secured to the ring B. It may be of one piece with the ring. As a variant, the tube is fixed to the ring B.

In another variant, the tube T has one end fixed to the ring B and one end able to move relative to the ring B, for example when the tube T is flexible.

The tube T is tubular, for example substantially cylindrical. In a variant, the tube widens from the opening 33 toward the removal opening 32 or vice versa. It is, for example, frustoconical overall. The benefit of widening the tube from the opening 33 or from a plane perpendicular to the axis of the tube and situated between the planes defined by the opening 32 and via the opening 33 as far as the removal opening 32 is that it ensures that oil is removed to the reservoir even if the machine and therefore the axis x is pitching or rolling. The benefit of narrowing the tube from the opening 33 or from a plane perpendicular to the axis of the tube and situated between the planes defined by the removal opening 32 and via the opening 33 is that the jet of oil exiting via the removal opening 32 is properly channeled so that it is properly directed toward the oil reservoir or directed toward a specific part of the oil reservoir. The shape of the tube T is adapted to suit the need.

The embodiment of FIGS. 4 and 5 is nonlimiting and other embodiments are of course conceivable. For example, the cap 31 has no tube 32. The removal opening 32 is then the opening 33.

In the embodiment of the figures, the duct 21 comprises the main duct 22, the inlet duct 23 and the outlet duct 24. In a variant, the inlet duct and/or the outlet duct is a portion of the main duct.

The rotor module 6 is delimited radially (with respect to the longitudinal axis x) by an external surface 61 facing towards stator module 7, namely facing the stator module 7, and an internal surface 62 facing toward the shaft 5, which is to say facing the shaft 5. These surfaces 61 and 62 are surfaces of the body C6 of the rotor module 6.

In the advantageous embodiment of FIGS. 4 and 5, the main duct 22 is entirely situated between an internal surface 5i of the body 50 of the shaft 5, the internal surface 5i facing toward the free volume 51 and delimiting the free volume 50, and the external surface 61 of the rotor module 6. The circulation of oil in the main duct 22 thus performs the dual function of regulating the flow rate of the oil leaving the nozzles 52 to 55 and of cooling the rotor module 6. The solution proposed therefore constitutes an additional means of cooling the rotor module 6, thereby making it possible to improve the performance of the energy conversion device 1. The improvement in energy performance is all the greater when the main duct 22 is configured for circulating the oil over a longer translational distance with respect to the shaft 5 along the axis x and/or rotationally with respect to the body of the shaft 5 about the axis x.

In the advantageous embodiment of FIGS. 4 and 5, the main duct 22 is formed in the body 50 of the shaft 5 and is closed by the rotor module 6, and more specifically by the internal surface 62 of the rotor module 6. This solution offers the advantage of being easy to implement, particularly when the shaft 5 has a one piece structure, it being possible for the duct 21 to be produced easily, for example by machining, on the surface of the body 50 of the shaft 5. Furthermore, the oil conveyed in the duct 21 comes into direct contact with the internal surface 62 of the rotor 6 thereby ensuring good cooling of the rotor 6. This solution also offers the advantage of being compact. It does not require the addition of a dedicated component in which to form the duct.

In a variant, the main duct 22 is formed inside the body 50 of the shaft 5 and is closed only by the body 50 of the shaft 5. In that case, the body 50 can be obtained by additive manufacturing (3D printing) or formed of two tubular parts one of which is fitted inside the other. In the latter instance, one of the parts comprises a channel and the other closes it to form the main duct 22 or the main duct is formed of two channels formed at the surface of each of the tubular parts, the duct being formed and closed by the fitting of one of the parts inside the other.

In another variant, the main duct is formed only in the rotor module 6 from a channel formed in a first body secured to the radial stack of laminations of the body C6 of the rotor module 6 and possibly from another channel formed in a second body secured to the first body.

The channel or the channels from which the main duct is formed is produced for example by machining in a body. In a variant, at least one channel, from which the main duct is formed, is produced for example by 3D printing, by an EDM-machined casting, or by sintering.

As a variant, at least a portion of the main duct 22 is formed between the internal surface of the stator module and the internal surface 62 of the rotor module 6.

More generally, at least a portion of the main duct is radially surrounded by the stator module 7.

The additional cooling afforded by this solution is all the better when the duct causes the oil to circulate over a long distance around the internal volume in rotation around the internal volume 51 tangentially and/or axially.

Advantageously, the main duct 22 is configured to cause the oil that it receives to circulate over the most-part of the length of the body C6 of the rotor module 6 and, for preference, over the entire length of the body C6 of the rotor module 6 along the axis x.

In the advantageous embodiment of FIGS. 4 and 5, the main duct 22 is a serpentine coil wound in turns around the internal volume 51. This solution is advantageous because it makes it possible to provide a good surface area for exchange between the oil and the rotor module 6. Furthermore, the temperature of the oil conveyed by the duct increases monotonically with the distance it covers along the longitudinal axis x with respect to the inlet of the main duct. It does not give rise to significant differences in temperature, which are more troublesome, in the same plane perpendicular to the longitudinal axis within the rotor module 6. If there is a temperature gradient as a function of the angle formed about the axis x, a mechanical imbalance can be generated by different thermal expansions of the rotor module 6 about the axis x.

As a preference, the main duct 22 is wound in a circular helix about the axis x, the axis of the helix being the longitudinal axis x. What is meant by a circular helix is a helix inscribed inside a cylinder of revolution. It should be noted that the helix does not necessarily have to be circular.

Advantageously, the duct 21 is configured to pick up oil as the shaft 5 rotates in the predetermined direction of rotation. The duct 21 then acts as a pump which picks up some of the oil injected by the pump 10 into the internal volume 50.

Advantageously, the duct 21 is configured to pick up the oil as the shaft 5 rotates in the predetermined direction of rotation so that the flow rate of oil picked up by the duct 21 increases monotonically over the entire range of operational rotational speeds of the device. The range of operational rotational speeds of the device is the range of rotational speeds within which the shaft 5 is intended to rotate in order for the conversion device to supply power to a load or an electrical network. This makes it possible for the duct 21 to obtain a progressive influence over the entire range of operating speeds and therefore regulate the flow rates of oil in the nozzles 52, 53, 54, 55 over the entire range of operating speeds.

To that end, when the main duct 22 is wound in a circular helix about the axis x, the helix is advantageously right-handed when the shaft 5 rotates about the longitudinal axis in the clockwise direction as viewed from the position E2 of the shaft of the machine. The position E2 is situated on the other side of the helix compared with the position E1 of the shaft of the machine. The helix rotates to the right when the shaft 5 is rotating about the longitudinal axis in the clockwise direction as seen from the position E2 of the shaft of the machine, along the axis x (to the right in the figure) in the direction of which the oil is injected into the internal volume 51. The oil is injected at the first position E1 of the shaft, along the axis, in the nonlimiting embodiment of FIG. 3, toward the position E2. If the direction of rotation of the shaft is counterclockwise as seen from the position E2 toward E1, or if the oil is injected in the direction from position E2 toward position E1 and the rotation of the shaft is clockwise as viewed from E2, then the helix is left-handed. It ascends in the clockwise direction.

The configuration of the main duct 22 to obtain pickup by a helix effect when the shaft 5 is rotating in the predetermined direction of rotation makes it possible to obtain an oil pickup flow rate that increases with speed. This increase may, for example, be monotonic. Because the pickup by the duct 21 is a function of the rotational speed of the shaft, it is possible, by correctly adjusting the geometric parameters of the duct, to influence the flow rate of oil leaving the set of nozzles 52 to 55, across the entire range of operating rotational speeds.

Conversely, if, in order to adjust the flow rates of the nozzles 52 to 55, it is necessary to limit the pickup in the helix at high speeds (for example, if the centrifugal forces become too great, for example in the case of a large-diameter machine and/or machine with a high rotational speed) all that is required is to reverse the direction of rotation of the helix in order to obtain the reverse effect.

Altering the pitch of the helix influences the uptake of the duct 21. Altering the cross section of the helix and the geometric characteristics of the inlet canal 22 and of the outlet canal 23 alters the pressure drop of the duct.

Figure 6:
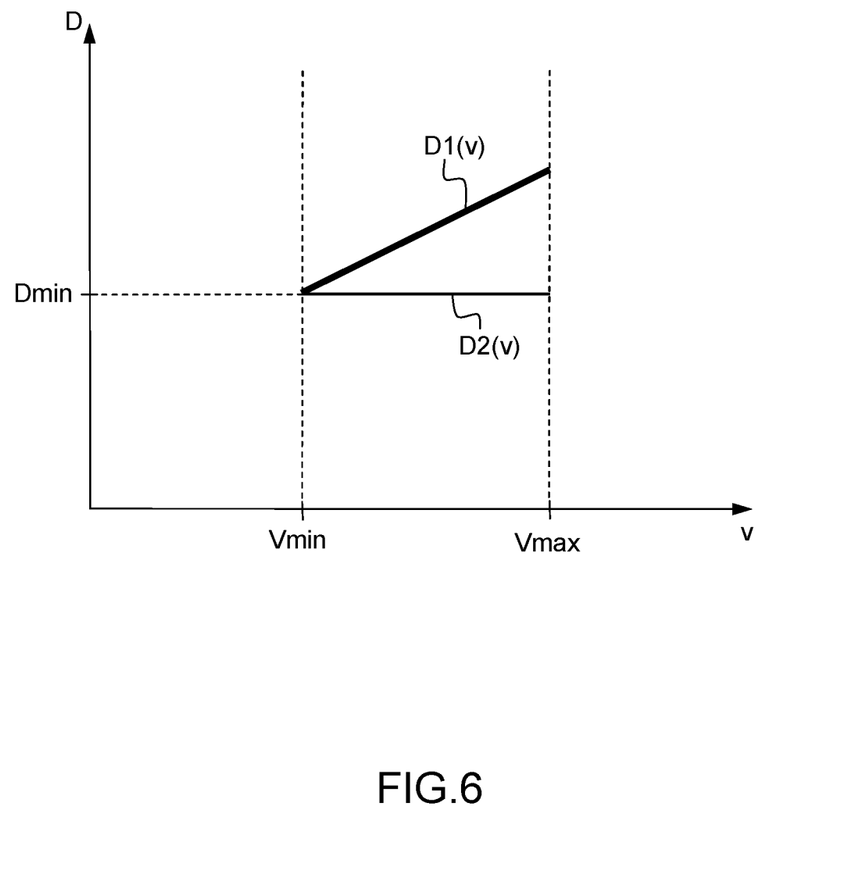
FIG. 6 is a schematic depiction, in thick line, of an oil flow rate $D1(v)$ of oil leaving the set of nozzles as a function of the angular velocity v of the shaft in the absence of an oil regulating device and, in fine line, an example of an oil flow rate $D2(v)$ of oil leaving the set of nozzles as a function of the angular velocity v of the shaft in the presence of the oil regulating device.

FIG. 6 depicts, in thick line, an oil flow rate D1 ($v$) for the oil exiting the set of nozzles 52 to 55 as a function of the angular velocity v of the shaft 5 when the conversion device is not fitted with the oil regulating device. The oil flow rate D($v$) has a minimum value Dmin for the minimum speed Vmin of the range of operating speeds PV. The flow rate increases as a linear function of speed, over the range of operating speeds extending up to Vmax, because of the fact that the flow rate injected by the pump into the internal volume 50 increases with speed.

The curve in fine line represents one example of an oil flow rate D2($v$) of oil exiting the set of nozzles 52 to 55 as a function of speed when the device according to the invention comprises the regulating circuit according to the invention and the duct is calibrated in such a way as to absorb all the surplus flow of oil injected by the pump 10 into the internal volume 50 beyond the minimum flow rate when the speed exceeds the minimum speed Vmin up to the maximum speed Vmax.

In general, the geometric characteristics of the duct 21 are defined in such a way that the duct absorbs all or some of the surplus flow rate of oil injected by the pump 10 into the internal volume 50, beyond the minimum flow rate Dmin between the minimum speed and the maximum speed.

Advantageously, the geometric characteristics of the duct 21 are defined so that the increase in flow rate leaving the set of nozzles as a result of an increase in the rotational speed of the shaft is substantially zero or lower than in the absence of the regulating circuit, over the entire range of rotational speeds extending from Vmin to Vmax. It should be noted that a substantially zero increase in the flow rate leaving the set of nozzles corresponds to a constant flow rate leaving the set of nozzles.

In a variant, the geometric characteristics of the duct 21 are defined so that the increase in the flow rate leaving the set of nozzles as a result of an increase in the rotational speed of the shaft is lower than in the absence of a regulating circuit, at least at an operating speed extending from Vmin to Vmax and without the flow rate exceeding the flow rate leaving the set of nozzles in the absence of the regulating circuit over the entire range of operating speeds.

It should be noted that the geometric characteristics of the duct 21 can be defined so that the flow rate leaving the set of nozzles decreases over a subrange of speeds comprised within the range of operating speeds or over the entire range of operating speeds. In a variant, the geometric characteristics of the duct 21 may be defined so that the flow rate leaving the set of nozzles is substantially constant between Vmin and an intermediate speed and increases beyond the intermediate speed. Geometric characteristics of the duct 21 are adapted according to what is required.

All the curves for flow rate comprised between D2($v$) and D1($v$) can be obtained. It is even possible to obtain a flow rate curve that has at least one portion below or equal to D2($v$).

The proposed solution therefore makes it possible to limit the oil mist by regulating the flow rate of oil sprayed by the nozzles 52 to 55 across the entire range of operating speeds of the machine.

The geometric characteristics of the duct are, for example, defined using a finite-element method to calculate the various flow rates within the energy conversion device. The geometric parameters of the duct are regulated by iteration until there is obtained a predetermined curve of flow rate of oil leaving the set of nozzles over a predetermined range of speeds for a predetermined curve of the flow rate of oil supplied by a pump at the inlet of the shaft 5 over the predetermined range of speeds and for predetermined geometric characteristics of the nozzles. As a variant, the geometric characteristics of the duct could be defined by modelling using analytical calculation or else using an iterative experimental approach.

In the embodiment shown in the figures, the cross section of the helix is rectangular and identical along the entire length of the helix.

That embodiment is nonlimiting. The cross section of the duct may, for example, be U-shaped, which is to say rectangular with two rounded adjacent corners, or circular, or may have some other closed flat curved shape.

In a variant, the cross-sectional shape of the helix and/or the size of the cross section and/or the pitch of the helix and/or the direction of the helix changes along the length of the helix, which is to say along the shaft. It is, for example, possible, to transition from a right-handed helix to a left-handed helix.

In the embodiment of FIGS. 4 and 5, the main duct 22 is helicoidal. As a variant, the main duct extends linearly along the axis x. As a variant, the main duct comprises duct portions extending substantially linearly along the axis x and angularly distributed about the axis x. The duct portions are connected by curved ducts, for example U-shaped. In such cases, the duct no longer draws up fluid through a helix effect. By contrast, the increase in the flow rate through the nozzles as a result of the increase in the rotational speed of the shaft is limited due to centrifugal force.

Advantageously, an outlet cross section of the duct has a larger area than an inlet section of the duct. This solution allows better expulsion of the oil by centrifugal force. However, this feature is not compulsory.

In the embodiment of FIGS. 4 and 5, the energy conversion device comprises a single regulating device. As a variant, it comprises several regulating circuits and therefore several ducts which may have the same shape or different shapes. The regulating device may for example comprise several helical ducts.

Several regulating circuits or ducts may share the one same removal device or the removal devices of the various ducts are distinct.

In the embodiment of the figures, the shaft comprises a body 50 delimiting the internal volume 51 into which the oil is injected. The internal volume 51 is free. In other words, the internal volume is intended to be completely filled with oil during the operation of the device. The duct may be completely filled with oil or be filled with oil and air during the operation of the device.

As a variant, the internal volume 51 comprises a hollow or solid internal body completely radially surrounded by the body 50. The internal volume 51 also comprises a free volume intended to receive the oil when the device is in operation. This free volume may comprise a volume surrounded by the internal body and/or a tubular volume radially surrounding the internal body and radially surrounded by the body 50.

In the embodiment of the figures, the inlet of the duct 21 is situated upstream of some of the inlets of the nozzles along the axis x and the outlet of the duct is situated downstream of the inlets of the nozzles along the axis x. In a variant, the inlet of at least one nozzle is situated upstream of the inlet of the duct 21 and/or the inlet of at least one nozzle is situated downstream of the outlet of the duct 21.

The invention claimed is:

1. An energy conversion device able to produce electricity from a mechanical energy and/or vice versa, the energy conversion device comprising:
    a casing,
    a shaft comprising a body defining an internal volume, the shaft being intended to rotate in a predetermined direction about a longitudinal axis with respect to the casing in a predetermined range of rotational speeds,
    a rotor module secured to the shaft,
    a stator module secured to the casing, the rotor module and the stator module comprising a field winding and an armature winding that are magnetically coupled to one another, the casing delimiting an internal volume housing the rotor module and the stator module and comprising a cavity surrounding the rotor module and the stator module,
    a set of at least one nozzle passing through the body and providing fluidic communication between the internal volume and the cavity, the set of at least one nozzle being configured to form an oil mist in the cavity under the effect of the rotation of the shaft in the range of rotational speeds, from some of the oil injected into the internal volume of the hollow shaft, the oil mist being intended to come into direct physical contact with the rotor module and the stator module,
    a set of at least one regulating circuit configured to limit an increase in the flow rate of oil passing from the internal volume to the cavity through the set of at least one nozzle, said increase being due to an increase in the flow rate of oil injected into the internal volume, the regulating circuit comprising:
    a duct secured to the shaft and comprising an inlet communicating with the internal volume so as to receive, under the effect of the rotation of the shaft, another portion of the oil injected into the internal volume, the duct conveying the other portion of the oil to an outlet of the duct, a removal device configured to remove at least a portion of the oil leaving the duct into an oil reservoir without contributing to the oil mist.

2. The energy conversion device as claimed in claim 1, comprising an oil circulation pump configured to take oil from the oil reservoir and inject it into the internal volume of the shaft, the pump being mechanically coupled to the shaft so as to be rotationally driven by the shaft so that a flow rate of oil injected by the pump into the internal volume increases when there is an increase in the rotational speed of the shaft in the direction of rotation.

3. The energy conversion device as claimed in claim 1, wherein the duct comprises a main duct radially surrounded by the stator module and configured to convey the oil that it receives, when the shaft rotates, translationally with respect to the shaft along the longitudinal axis and/or rotationally with respect to the body of the shaft about the longitudinal axis, around the internal volume.

4. The energy conversion device as claimed in claim 3, wherein the main duct of the duct of a regulating circuit is formed in the body of the shaft and is closed by the rotor module.

5. The energy conversion device as claimed in claim 3, wherein the main duct of the duct of a regulating circuit is spiral wound around the longitudinal axis (x) and configured to draw oil into the inlet of the main duct as the shaft rotates.

6. The energy conversion device as claimed in claim 5, comprising an oil circulation pump configured to take oil from the oil reservoir and inject it into the internal volume of the shaft, the pump being mechanically coupled to the shaft so as to be rotationally driven by the shaft so that a flow rate of oil injected by the pump into the internal volume increases when there is an increase in the rotational speed of the shaft in the direction of rotation, wherein the geometric characteristics of the duct are defined so that the duct transports all or some of a surplus of the flow rate of oil injected by the pump into the internal volume, above and beyond a minimum flow rate, over the entire range of rotational speeds.

7. The energy conversion device as claimed in claim 1, wherein the removal device comprises a collecting cap placed in the cavity and fixed relative to the casing, the collecting cap radially surrounding an outlet of the duct so as to collect at least some of the oil leaving the duct under the effect of the centrifugal force as the shaft rotates in the direction of rotation.

8. The energy conversion device as claimed in claim 7, wherein the removal device comprises a removal opening situated facing the oil reservoir and allowing oil collected by the cap under gravity to be removed to the oil reservoir.

9. The energy conversion device as claimed in claim 7, wherein the collecting cap comprises a ring completely radially surrounding the outlet and configured so as to allow oil leaving the duct, to be held back radially, and axially in both directions, an opening being formed in the ring facing the oil reservoir.

10. The energy conversion device as claimed in claim 9, wherein the collecting ring is equipped with a removal tube having an inlet surrounding the opening and extending as far as the removal opening.

11. The energy conversion device as claimed in claim 1, wherein the duct is configured to limit an increase in the flow rate of oil passing from the internal volume to the cavity via the set of at least one nozzle, said increase being due to an increase in the flow rate of oil injected into the internal volume.

* * * * *